(12) United States Patent
Maxwell et al.

(10) Patent No.: US 6,238,473 B1
(45) Date of Patent: May 29, 2001

(54) KAOLIN CLAY AGGLOMERATES AND PROCESS FOR THE MANUFACTURE THEREOF

(75) Inventors: Chris B. Maxwell, Evans; Prakash B. Malla, Dublin, both of GA (US)

(73) Assignee: Thiele Kaolin Company, Sanderville, GA (US)

( * ) Notice: Subject to any disclaimer, the term of this patent is extended or adjusted under 35 U.S.C. 154(b) by 0 days.

(21) Appl. No.: 09/243,249

(22) Filed: Feb. 3, 1999

(51) Int. Cl.$^7$ ................................. C09C 1/42; C09C 3/04
(52) U.S. Cl. ........................ 106/486; 106/416; 264/117; 264/120
(58) Field of Search ..................... 106/416, 486; 501/141, 145; 264/109, 115, 117, 120

(56) References Cited

U.S. PATENT DOCUMENTS

| 3,586,523 | 6/1971 | Fanselow et al. . |
| 4,241,001 | 12/1980 | Lamond et al. . |
| 4,561,597 | 12/1985 | Cook et al. . |
| 4,593,860 | 6/1986 | Cook et al. . |
| 5,074,475 | 12/1991 | Suitch et al. . |
| 5,129,953 | 7/1992 | Suitch et al. . |
| 5,328,506 | 7/1994 | Crumbley et al. . |
| 5,364,579 | 11/1994 | Dunaway et al. . |

FOREIGN PATENT DOCUMENTS

WO97/42268   11/1997  (WO) .

OTHER PUBLICATIONS

Product Brochure from Bepex Corporation; "Sizing Up The Agglomeration Process"; publication date—1992 (No month).
Product Brochure from LCI Corporation; "KAHL Process Technology: Pelleting–The Economic Way Of Compacting And Shaping"; publication date—unknown.
Book entitled "Size Enlargement by Agglomeration"; Wolfgang Pietsch; John Wiley and Sons; publication date—1991 (No month).

*Primary Examiner*—Michael Marcheschi
(74) *Attorney, Agent, or Firm*—Kennedy, Davis & Hodge, LLP

(57) ABSTRACT

Kaolin clay agglomerates having improved bulk density, improved rheological properties and good optical properties are provided by mixing calcined kaolin clay, hydrous kaolin clay and water and then subjecting the mixture to high pressure in a compaction system.

10 Claims, No Drawings

KAOLIN CLAY AGGLOMERATES AND PROCESS FOR THE MANUFACTURE THEREOF

TECHNICAL FIELD

The present invention relates to kaolin clay agglomerates. In a more specific aspect, the present invention relates to kaolin clay agglomerates which have improved bulk density, improved Theological properties and good optical properties. This invention also relates to a process for the manufacture of these agglomerates.

This invention provides kaolin clay agglomerates which can be (a) handled and transported by conventional bulk systems and (b) effectively used in those applications where optical properties are critical product specifications.

BACKGROUND OF THE INVENTION

Kaolin is a naturally occurring, relatively fine, white clay mineral which may be generally described as a hydrated aluminum silicate. After purification and beneficiation, kaolin is widely used as a filler and pigment in various materials, such as rubber and resins, and in various coatings, such as paints and coatings for paper.

The use of kaolin clay in paper coatings serves, for example, to improve brightness, color, gloss, smoothness, opacity, printability and uniformity of appearance of the coated paper. As a filler in paper formulations, kaolin clay is used to extend fiber and reduce cost and to improve opacity, brightness and other desirable characteristics of the paper product.

Calcined kaolin clay is a particular type of kaolin and is often used in large quantities for paper manufacture. Calcined kaolin can be obtained by heating beneficiated kaolin clay at temperatures of at least 550° C. The calcination step dehydroxylates and converts the kaolin to a noncrystalline aluminosilicate phase. The term "dehydroxylates" refers to the removal of structural hydroxide groups from the kaolin as water vapor. Calcined kaolin has improved light scattering characteristics (as compared to the non-calcined kaolin) and, therefore, contributes a high degree of opacity to the coated paper.

Fanselow et al. U.S. Pat. No. 3,586,523 describes examples of calcined kaolin clay.

Calcined kaolin clay pigments (such as the product marketed by Thiele Kaolin Company of Sandersville, Georgia under the trademark KAOCAL) are widely used in the paper industry. Commonly, calcined clay is blended with hydrous kaolin in the paper mills. Typically, these blends are comprised of 10–20 parts by weight calcined kaolin and 90–80 parts by weight hydrous kaolin. During processing, the calcined clay is usually pulverized in a high energy impact mill and then air-classified to remove abrasive particles larger than 325 mesh. The abrasive particles tend to cause scratching problems during coating of a paper.

The resulting pulverized calcined clay product is fluffy and has a low bulk density when compared to a spray dried hydrous kaolin clay. For example, the bulk density of calcined kaolin is about 10–15 lb/ft$^3$, whereas the bulk density of spray dried hydrous kaolin is about 40–55 lb/ft$^3$. The fluffy low bulk density calcined clay powder can be difficult to handle with conventional bulk handling systems. Therefore, the powder is shipped dry in bags, sparger cars or as an optimally dispersed slurry, typically at about 50% solids. In addition, the low bulk density of dry calcined clay commonly requires more bags or will occupy a larger volume in sparger cars when compared to a spray dried hydrous clay and is, therefore, more expensive to ship.

In the industry, efforts have been made to improve the bulk density, dusting and powder flow characteristics of calcined clay. For example, in Suitch et al. U.S. Pat. Nos. 5,074,475 and 5,129,593, an aqueous slurry of calcined clay is spray dried to improve bulk density and flowability. However, the spray dried material still creates dust and is difficult to handle in bulk compared to a product agglomerated to a larger size.

Cook et al. U.S. Pat. Nos. 4,561,597 and 4,953,860 increase the bulk density of calcined clay by dry ball milling calcined clay powder, but the flowability of the powder remains poor. Furthermore, the dry ball milling step needs to be followed by pulverizing in a high-energy impact mill to minimize slurry screen residue. However, pulverizing after the dry ball milling step may also produce a product with a lower bulk density.

Dunaway et al. U.S. Pat. No. 5,364,579 pelletizes calcined clay using a pan pelletizer or pin mixer in the presence of 1% ammonia vapor to improve flowability. This process does not use water and, therefore, eliminates the use of an energy intensive drying step. However, the Dunaway et al. patent does not mention any improvement in bulk density or integrity of the pellets compared to the original feed calcined clay.

Crumbley et al. U.S. Pat. No. 5,328,506 discloses a process in which calcined clay is kneaded to form dough-like agglomerates using 1–30% moisture. The claimed advantages of this process are that the product is shipped without drying and is dust free, resists break down to dust during shipping and is capable of being dispersed in water when agitated using conventional make down equipment. However, this process does not use any pressure for agglomeration, and consequently the agglomerated calcined clay product even with 30% hydrous clay does not show an improved bulk density.

Munstennan et al. International Patent Publication No. WO 97/42268 describes a process for producing a dust free, free flowing and high bulk density material using a mixture of water and calcined clay, followed by pelletizing in a disc pelletizer and then drying. The bulk density of the agglomerated product is reported to be about 30 lb/ft$^3$. The disc pelletizer forms rounded agglomerates by tumbling action, and no external pressure is applied. Consequently, the resulting agglomerated product is expected to be relatively weak.

In view of the foregoing discussion, there is a need in the industry for a process by which calcined clay can be agglomerated to provide a high bulk density, non-dusting, high strength product which can be transported and handled in bulk by conventional systems and which has low screen residue, while still retaining the optical properties which are desirable for paper coating and filling applications.

SUMMARY OF THE INVENTION

Briefly described, the present invention provides kaolin clay agglomerates having high bulk densities and improved Theological (i.e., flow) characteristics. In addition, these agglomerates are low dusting and have a low 325 mesh screen residue. The kaolin clay agglomerates provided by this invention retain the optical properties which are desirable for certain applications, including paper coating and filler formulations.

The present invention also provides kaolin clay agglomerates which can be transported and handled using equipment and systems which are conventional in the kaolin clay industry.

This invention further provides a process for the manufacture of kaolin clay agglomerates having the properties and characteristics described above.

Accordingly, an object of this invention is to provide kaolin clay agglomerates.

Another object of this invention is to provide kaolin clay agglomerates having high bulk densities.

Another object of this invention is to provide kaolin clay agglomerates having low dusting values.

Another object of this invention is to provide kaolin clay agglomerates having low 325 mesh screen residues.

Another object of this invention is to provide kaolin clay agglomerates having improved rheological characteristics.

Another object of this invention is to provide kaolin clay agglomerates having good optical properties.

Another object of this invention is to provide kaolin clay agglomerates which can be transported and handled using equipment and systems which are conventional in the kaolin clay industry.

A further object of this invention is to provide a process for the manufacture of kaolin clay agglomerates.

A further object of this invention is to provide a process for the manufacture of kaolin clay agglomerates having high bulk densities.

A further object of this invention is to provide a process for the manufacture of kaolin clay agglomerates having low dusting values.

A further object of this invention is to provide a process for the manufacture of kaolin clay agglomerates having low 325 mesh screen residues.

A further object of this invention is to provide a process for the manufacture of kaolin clay agglomerates having improved Theological characteristics.

A further object of this invention is to provide a process for the manufacture of kaolin clay agglomerates having good optical properties.

A further object of this invention is to provide a process for the manufacture of kaolin clay agglomerates which can be transported and handled using equipment and systems which are conventional in the kaolin clay industry.

These and other objects, features and advantages of this invention will become apparent from the following detailed description.

DETAILED DESCRIPTION OF THE INVENTION

In accordance with the present invention, calcined clay is agglomerated into a high bulk density and low dusting form which has low 325 mesh screen residue and improved rheological characteristics, while retaining the optical properties desirable for paper coating and filling applications.

The agglomeration is performed using a pressure method, such as either an extrusion system or a roll compactor system. Although nonpressure equipment (such as kneaders, pin mixers, disc pelletizers and pan pelletizers) form agglomerates of somewhat improved bulk density, we have found that a pressure method is essential to manufacture agglomerates of high bulk density and high strength.

When pressure is applied to a particulate solid (as in a pellet mill or roll compactor), densification occurs as a result of (a) rearrangement of the particles which leads to a closer and denser packing (at low pressure) and (b) elastic and plastic deformation of particles which causes the particles to flow into void spaces and increase the area of interparticle contact (at high pressure). For a brittle material and at high pressure, densification occurs by further rearrangement of the fractured particles.

An example of an effective extrusion system is the KAHL pellet mill marketed by LCI Corporation, Charlotte, N.C. In pelleting, a cylindrical pressing tool rolls over a layer of material deposited on a perforated support (die). The material is first densified in the wedge shaped nip and then extruded through the perforations. There is an adjustable gap between the pressing tool and the die at the point of closest approach to provide predensification and to avoid damage by metallic contact.

An example of an effective roll compactor system is provided by Hosokawa Bepex Corporation, Minneapolis, Minn. In the roll compactor system, material is squeezed between two counter rotating rollers to form dense sheets which can be crushed and then screened to yield a granular product. The surfaces of the rollers can be smooth, fluted, corrugated, waffled, etc.

For a further description of various agglomeration methods, reference is made to *Size Enlargement by Agglomeration* by Wolfgang Pietsch, Wiley & Sons (1991).

High pressure is essential in the present invention to produce agglomerates having high bulk density and sufficient strength and which can be transported and handled in bulk. However, the high pressures used in conventional methods bring the particles close to each other and result in strong bonds between particles. In some instances, fusion may take place at the grain boundaries. The strong bonds (or fusion) between the particles are responsible for the high residue in the resulting product. High pressure also tends to break the light scattering aggregates present in the starting calcined clay.

To counteract the disadvantages of conventional methods, the pre-agglomeration, agglomeration and post-agglomeration steps of the present invention must be optimized to achieve an agglomerated product having low screen residue that retains the optical properties desirable for paper coating and filling applications.

For purposes of this application, the term "compaction" will be understood to refer to the densification of kaolin clay particles in an extrusion system and/or a roll compactor system as the context requires.

Pre-Agglomeration

The pre-agglomeration step of this invention involves mixing of water and hydrous kaolin with calcined clay. The method by which water is added to the clay is important to insure uniform distribution of the water within the mixture and to avoid clumping or beading. The addition of water is preferably done in the form of a mist, spray or fine stream, but can also be achieved through the addition of the hydrous kaolin.

The amounts of water and hydrous clay are also critical in achieving a low residue agglomerated product. Water molecules act as a lubricant during compaction and reduce the interparticle (as well as particle to die or roller wall) frictional forces, thereby allowing a satisfactory degree of compaction while minimizing breakdown of the particles. In general, higher amounts of water result in a lower residue, but an excessive amount of water should be avoided. Excess amounts of water cause the clay to form a slurry which is unsuitable for compaction. Higher amounts of water also reduce the extent of compaction of the material and, therefore, decrease the degree of densification. Therefore, an optimum amount of water must be identified.

The presence of a small amount of hydrous clay increases the plasticity of the blend which optimizes the degree of compaction and minimizes breakdown of the particles.

Agglomeration

In addition to the pre-agglomeration step, certain factors in the agglomeration step affect the quality of the agglomerated product. An important factor is the total pressure experienced by the particles during compaction. Normally, a higher pressure produces a higher residue, as a result of the particles approaching each other closely and forming strong bonds.

In roll compactor systems, adjusting the gap between the rolls can change the pressure. In a pellet mill, the length and diameter of the die dictate the overall pressure; a higher length:diameter ratio produces a higher pressure.

The use of high pressure is essential to produce the kaolin clay agglomerates of this invention. Although pressure values can vary, we have found that the roll compactor system will produce the desired kaolin clay agglomerates if a pressure of 300–1500 lbs. per square inch is used (preferably 300–1000, and most preferably 500–1000, lbs. per square inch). However, the range of high pressure in an extrusion system cannot be accurately determined in many instances due to various factors, such as the current inability to measure the actual pressure within the open areas of the die during extrusion. When measurable, we do know that a high pressure is used during extrusion.

Post-Agglomeration

The post-agglomeration step is optional and may include drying depending on the amount of moisture used in compaction and the desired moisture content of the final product. Drying affects the amount of residue present in the product. In drying, several factors (such as temperature, drying rate, homogeneity of drying, amount of moisture remaining after drying, etc.) are important for the quality of the product. Higher temperature and non-homogeneous drying yield a product having a higher screen residue due to an intensive baking of a certain part of the product. A product that is dried completely also tends to have a higher residue value compared to a product that is dried to a certain moisture content (e.g., 2–10%).

The amount of work used in slurrying the compacted product will also affect the screen residue of the product; the higher the work input, the lower the residue. By using higher solids during the slurrying process, the compacted particles experience a greater degree of collision among themselves, thereby breaking down the larger particles or aggregates to produce a low 325 mesh screen residue.

For purposes of this application, the following terms will be understood as follows:

Bulk Density—refers to the mass per unit volume, generally in grams per cubic centimeter or pounds per cubic foot. In this invention, the kaolin clay agglomerates have a high bulk density (at least about 30 lbs./cu. ft., preferably at least about 40 lbs./cu. ft.).

To determine bulk density, 200 g of the kaolin clay agglomerate product is poured into a 500 ml graduated cylinder. The cylinder is then lightly tapped 120 times on a soft surface. The volume of product in the cylinder is then measured (in ml). The bulk density is the mass of product (200 g) divided by the measured volume (in ml) of the product, which is then converted to pounds per cubic foot.

Dust—refers to finely divided dry solid particles which will pass through a 200 mesh screen when screened dry. In this invention, the kaolin clay agglomerates have a low dusting value (less than about 2 percent, preferably less than about 1 percent).

Moisture Content—refers to the moisture content of the final product. In this invention, the kaolin clay agglomerates have a moisture content of about 0–10 percent, preferably about 2–7 percent.

325 Mesh Screen Residue—refers to the amount of material which is retained on a 325 mesh screen when screened in slurry form; refer. to TAPPI Method No. 681. In this invention, the residue is less than about 0.05 percent and preferably less than about 0.01 percent (i.e., a low 325 mesh screen residue).

Optical Properties—also referred to as opacity or light scattering ability; determined for the kaolin clay agglomerates of this invention by the scattering coefficient, which is measured by the method described in TAPPI, 1978, Vol. 61, No. 6, pages 78–80.

Brookfield and Hercules Viscosities—determined by TAPPI Method No. T-648-OM-97-as revised in 1997. This method sets forth specific procedures for determination of Brookfield (low shear) and Hercules (high shear) viscosities.

In addition, by the term "good optical properties", we mean that the products of this invention can be effectively used in those applications when opacity is a desired feature, such as in paper coatings. By the term "improved rheological characteristics", we mean that the products of this invention (a) have a viscosity (i.e., flow characteristics) which enables such products to be used in coatings which can be worked, pumped and/or coated by means which are conventional in the paper industry and (b) have a viscosity which is improved as compared to the viscosity of the starting clay mixture.

The present invention is further illustrated by the following examples which are illustrative of certain embodiments designed to teach those of ordinary skill in the art how to practice this invention and to represent the best mode contemplated for practicing this invention.

EXAMPLE 1

A 100% calcined clay marketed under the trademark KAOCAL by Thiele Kaolin Company, Sandersville, Ga., is mixed thoroughly with 33.6 and 41.0% moisture in a laboratory kneader for 5 min. The homogenized mixtures are then extruded using a laboratory KAHL pellet mill fitted with a die 3 mm in diameter and 9 mm in length. The wet extruded pellets are slurried directly (without drying) at about 51.0% solids with 2.5 lb/T soda ash and 1.5 lb/T sodium polyacrylate dispersant. Hercules high shear viscosity, 325 mesh screen residue and scattering coefficient are measured as shown in Table I. A portion of the pellets is dried completely at 105° C., slurried and characterized. The bulk density of the pellets before and after drying is also measured. The extrusion is done at 33.6 and 41.0% moisture.

EXAMPLE 2

The procedure of Example 1 is followed, but the calcined clay is blended with a pulverized hydrous kaolin clay marketed under the trademark KAOGLOSS 90 by Thiele Kaolin Company. The ratio of calcined clay:hydrous clay is 3:1, and the extrusion is done at 30.1 and 40.0% moisture.

EXAMPLE 3

The procedure of Example 1 is followed, but the calcined clay is blended with KAOGLOSS 90 clay at a 1:1 ratio and extruded with 28% moisture.

EXAMPLE 4

The procedure of Example 1 is followed, but the calcined clay is blended with KAOGLOSS 90 clay at a 1:3 ratio and extruded with 21.7% moisture.

EXAMPLE 5

The procedure of Example 1 is followed, but 100% hydrous clay is extruded with 16.7% moisture.

With reference to the data shown in Table I, Examples 1–5 show the effect of moisture, hydrous clay and drying on the properties of the pelleted products, especially the 325 mesh screen residue and scattering coefficient.

For example, the residue decreases from 2.49% to 0.1684% when the extrusion moisture is increased from 33.6% to 41.0% in Example 1. At the same time, the scattering coefficient is improved from 0.74 to 1.02. The same trend is observed for Example 2, except that the residue is further decreased when extrusion moisture increases form 30.1 to 40.0%. The loss on scattering coefficient is also minimized compared to the control sample.

The amount of hydrous clay present in the blend has a significant effect on residue and scattering coefficient. For example, at higher moisture levels, the 100% calcined clay sample has a much higher residue (as received) compared to the sample containing 25 and higher percentages of hydrous clay. Examples 1–5 also show that there is no benefit of adding hydrous clay in excess of 25%. The scattering coefficient of the blend samples is equivalent to their respective control samples, whereas the 100% calcined clay exhibits a reduced scattering coefficient compared to the control sample.

Drying also has a significant effect on residue. In each of the examples, the dried samples exhibit higher amounts of residue compared to the wet samples.

The data in Table I show that the bulk densities of the pelleted samples increase remarkably compared to the unpelleted control samples. In addition to density, the pelleted products also exhibit an improved high shear viscosity.

TABLE I

| Examples | Slurried Solids % | Hercules Viscosity Dyne | Hercules Viscosity RPM | Screen Residue 325 mesh | Scatter 457 nm | Bulk Density Lb./ft$^3$ |
|---|---|---|---|---|---|---|
| Example 1 100% calcined 33.6% moisture | | | | | | |
| wet | 51.3 | 1 | 1100 | 2.49 | 0.74 | 52 |
| dry | 51.1 | 1 | 1100 | 3.39 | 0.80 | 40 |
| 41.0% moisture | | | | | | |
| wet | 51.0 | 1 | 1100 | 0.1684 | 1.02 | 48 |
| dry | | | | 5.4505 | — | 32 |
| control | 51.6 | 18 | 300 | 0.0050 | 1.22 | 19 |
| Example 2 75/25 calcined/hydrous 30.1% moisture | | | | | | |
| wet | 57.1 | 1 | 1100 | 1.12 | 0.81 | 53 |
| dry | 56.2 | 1 | 1100 | 5.29 | 0.74 | 39 |
| 40% moisture | | | | | | |
| wet | 54.7 | 1 | 1100 | 0.0225 | 0.88 | 46 |
| dry | 55.5 | 1 | 1100 | 2.9702 | 0.93 | 31 |
| control | 55.3 | 18 | 900 | 0.0031 | 1.01 | |
| Example 3 50/50 calcined/hydrous 28.0% moisture | | | | | | |
| wet | 60.5 | 1 | 1100 | 0.019 | 0.88 | 55 |
| dry | 60.8 | 1 | 1100 | 0.252 | 0.80 | 43 |
| control | 60.5 | 18 | 1020 | 0.0042 | 0.83 | |
| Example 4 25/75 calcined/hydrous 21.7% moisture | | | | | | |
| wet | 64.1 | 1 | 1100 | 0.022 | 0.62 | 58 |
| dry | 65.9 | 1 | 1100 | 0.067 | 0.60 | 50 |
| control | 64.5 | 7 | 1100 | 0.0021 | 0.61 | |
| Example 5 100% hydrous 16.7% moisture | | | | | | |
| wet | 69.1 | 3 | 1100 | 0.041 | 0.36 | 65 |
| dry | 70.5 | 3 | 1100 | 0.167 | 0.36 | 54 |
| control | 70.0 | 7 | 1100 | 0.0002 | 0.37 | 49 |

EXAMPLE 6

A 3:1 blend ratio of KAOCAL:KAOGLOSS 90 clays with 38% moisture is pelleted using the KAHL pellet mill fitted with a die 6 mm in diameter and 18 mm in length. The pellets are dried completely (0% moisture) at 80° C. in a laboratory forced air convection oven for 140 min. During drying, the pellets are stirred every 10 min to facilitate uniform drying. The dried pellets are slurried at 57.4% solids with 2.5 lb/T soda ash and 1.5 lb/T sodium polyacrylate dispersant and screened. The 325 mesh screen residue values are presented in Table II.

EXAMPLE 7

The procedure of Example 6 is followed, but the pellets are dried to 5% final moisture for 110 min and slurried at 56.3% solids.

EXAMPLE 8

The procedure of Example 6 is followed, but the pellets are dried completely at 110° C. for 90 min and slurried at 57.1% solids.

EXAMPLE 9

The procedure of Example 8 is followed, but the pellets are dried to 5% final moisture for 75 min and slurried at 57.1% solids

EXAMPLE 10

The procedure of Example 6 is followed, but the pellets are dried to 2.5% final moisture at 95° C. for 90 min and slurried at 57.5, 57.1 and 57.0% solids.

The data in Table II show that products with lower screen residues can be produced by controlling the drying temperature and final moisture content. More specifically, drying temperatures lower than 110° C. are shown as producing lower screen residues.

TABLE II

|  | Drying Temperature ° C. | Final Moisture % | 325 Mesh Screen Residue |
|---|---|---|---|
| 6 | 80 | 0 | 0.0070 |
| 7 | 80 | 5 | 0.0061 |
| 8 | 110 | 0 | 0.0400 |
| 9 | 110 | 5 | 0.0156 |
| 10a | 95 | 2.5 | 0.0078 |
| 10b | 95 | 2.5 | 0.0082 |
| 10c | 95 | 2.5 | 0.0081 |

Examples 10a, 10b and 10c are replicates.

EXAMPLE 11

A 100% KAOCAL clay is blended with 10% moisture in a ribbon blender and compacted using a roll compactor at a pressure of 900 psi. The compacted material is chopped with a flake breaker followed by screening through a 10 mesh screen. The fines smaller than 10 mesh in size are continuously recycled to the compactor with the feed. The flakes larger than 10 mesh in size are collected and characterized (see Table III). The slurry sample is prepared at 51.6% solids with 2.5 lb/T soda ash and 1.5 lb/T sodium polyacrylate.

EXAMPLE 12

A 3:1 blend of dry KAOCAL clay:spray dried KAOGLOSS 90 clay is prepared without additional water in a ribbon blender and compacted using a roll compactor at a pressure of 500 psi. The compacted material is then chopped with a flake breaker followed by screening through a 10 mesh screen. The fines smaller than 10 mesh in size are continuously recycled to the compactor with the feed. The flakes larger than 10 mesh in size are collected and characterized (see Table III). The slurry sample is prepared at 56.0% solids with 2.5 lb/T soda ash and 1.5 lb/T sodium polyacrylate.

EXAMPLE 13

The procedure of Example 12 is followed, but the clay feed is compacted at 1500 psi.

EXAMPLE 14

Dry KAOCAL clay and spray dried KAOGLOSS 90 clay are blended in a ribbon blender. The mixture is then fed to a TURBULIZER processor (Model TCJS-8 from Hosokawa Bepex Corporation, Minneapolis, Minn.) where an appropriate amount of slurry KAOGLOSS 90 clay (60 wt. %) to yield a KAOCAL:KAOGLOSS 90 blend ratio of 3:1 with 10% moisture is added in the form of a spray. The final blend is then compacted at 500 psi and characterized as in Example 12.

EXAMPLE 15

The procedure of Example 14 is followed, but the clay feed to the compactor is compacted at 1000 psi.

EXAMPLE 16

The procedure of Example 14 is followed, but the clay feed to the compactor is compacted at 1500 psi.

EXAMPLE 17

The procedure of Example 14 is followed, but the clay feed to the compactor contains 5% moisture and is compacted at 500 psi.

EXAMPLE 18

The procedure of Example 14 is followed, but the clay feed to the compactor contains 5% moisture and is compacted at 1000 psi.

EXAMPLE 19

The procedure of Example 14 is followed, but the clay feed to the compactor contains 5% moisture and is compacted at 1500 psi.

TABLE III

| Example | 11 | 12 | 13 | 14 | 15 | 16 | 17 | 18 | 19 |
|---|---|---|---|---|---|---|---|---|---|
| [1]Press/[2]Moist | 900/10 | 500/0 | 1500/0 | 500/10 | 1000/10 | 1500/10 | 500/5 | 1000/5 | 1500/5 |
| Bulk Density lb/ft³(120 taps) | | | | | | | | | |
| wet | — | — | — | 45.0 | 48.9 | 50.0 | 45.0 | 47.1 | 48.0 |
| dry | 42.0 | 48.0 | 48.0 | 41.6 | 45.0 | 46.0 | 43.3 | 45.7 | 46.6 |
| 56% Solids Slurry | | | | | | | | | |
| Residue, % | 1.304 | 1.3687 | 1.9026 | 0.0231 | 0.1111 | 3.4107 | 0.2484 | 3.0507 | 6.0477 |
| Scattering Coeff (457 NM) | 0.99 | 0.84 | 0.81 | 0.89 | 0.86 | 0.83 | 0.86 | 0.83 | 0.73 |

[1]compaction pressure (500, 1000, 1500 psi)
[2]compaction moisture (0, 5, 10%)

A comparison of Examples 11 and 14 shows that the presence of as little as 25% hydrous clay significantly reduces the residue value. Examples 12–19 show that a lower pressure and a higher feed moisture are desirable to achieve a compacted product having a low residue. The best condition is 500 psi roller pressure and 10% moisture.

EXAMPLE 20

A 75:25 blend of KAOCAL:KAOGLOSS 90 clays with 38% moisture is pelleted using a pilot scale KAHL pellet mill (die having 8 mm diameter and 32 mm length). The pellets are dried to about 5% moisture using a forced air pilot tray dryer at 95° C. The dried pellets are made down at 57.5% slurry with 2.5 lb/T soda ash and 1.5 lb/T sodium polyacrylate dispersant. The residue, viscosity and scattering coefficient are measured (see Table IV).

EXAMPLE 21

The procedure of Example 12 is followed, but the dried pellets are made down at 60.0% solids.

EXAMPLE 22

The procedure of Example 14 is followed, except that the product is slurried at 57.4% solids.

EXAMPLE 23

The procedure of Example 14 is followed, except that the product is slurried at 60.2% solids.

EXAMPLE 24

The procedure of Example 15 is followed, except that the product is slurried at 57.3% solids.

EXAMPLE 25

The procedure of Example 15 is followed, except that the product is slurried at 60.5% solids.

Examples 20–25 show that the pelleted products have improved viscosity, especially under high shear, at equal or higher solids compared to the control. Also, the screen residue of the products of the present invention is improved at higher solids while the product retains good optical properties.

TABLE IV

| Example | Slurry Solids % | Screen Residue (325 mesh) % | Scatter Coeff | Brookfield Viscosity @ 20 RPM (No. 1 spindle) cP | Hercules Viscosity Dyne | Hercules Viscosity RPM |
|---|---|---|---|---|---|---|
| Control (75/25 KC/KG90) Extrusion | 57.1 | 0.0066 | 0.95 | 52 | 18 | 400 |
|  | 60.5 | 0.0010 | 1.02 | 117 | 18 | 200 |
| 20 | 57.5 | 0.0311 | 0.91 | 38 | 1.5 | 1100 |
| 21 | 60.0 | 0.0083 | 0.93 | 79 | 18 | 700 |
| Roll compactor |  |  |  |  |  |  |
| 22 | 57.4 | 0.0236 | 0.89 | 43 | 2 | 1100 |
| 23 | 60.2 | 0.0189 | 0.89 | 91 | 18 | 500 |
| Roll compactor |  |  |  |  |  |  |
| 24 | 57.3 | 0.2101 | 0.86 | 36 | 1.0 | 1100 |
| 25 | 60.5 | 0.0101 | 0.84 | 52 | 1.5 | 1100 |

EXAMPLE 26

A 75:25 blend of KAOCAL:KAOGLOSS 90 clays with 38% moisture is pelleted using a pilot scale KAHL pellet mill (die having 8 mm diameter and 32 mm length). The pellets are dried to about 5% moisture using a method similar to that described by Munsterman and Suitch WO 97/42268. The pellets are poured into a dozen cylinders (1.5" diameter corresponding to 0.01227 ft $^2$) and compressed under 600 pounds per square foot (psf) pressure. The contents of the cylinders are combined and tested for dry screen retention. U.S. Sieve Series Nos. 35, 60, 100, and 200 are used in conjunction with Rotap vibratory screen tester for dry sieve analysis. The weight of sample remaining on each sieve is converted to percent of total sample screened shown in Table V. The procedure is repeated with fresh pellets at compression pressures of 1200 and 1800 psf.

TABLE V

| US Sieve No. | Percent sieve retention as a function of applied pressure | | | |
|---|---|---|---|---|
|  | 0 psf | 600 psf | 1200 psf | 1800 psf |
| 35 | 92.0 | 85.6 | 88.3 | 85.1 |
| 60 | 3.5 | 6.9 | 5.4 | 6.5 |
| 100 | 2.0 | 3.5 | 2.8 | 4.2 |
| 200 | 2.0 | 2.9 | 2.8 | 3.0 |
| pan | 0.5 | 1.1 | 0.7 | 1.2 |

EXAMPLE 27

The 10% moisture compacted kaolin prepared in Example 15, prior to slurry makedown and characterization, is used in this example. The compacted kaolin is tested for compression strength using the method described in Example 26 at 600, 1200, and 1800 psf. The weight of sample remaining on each sieve is converted to percent of total sample screened shown in Table VI.

TABLE VI

| US Sieve No. | Percent sieve retention as a function of applied pressure | | | |
|---|---|---|---|---|
|  | 0 psf | 600 psf | 1200 psf | 1800 psf |
| 35 | 82.0 | 77.3 | 77.3 | 75.5 |
| 60 | 8.5 | 10.7 | 10.7 | 11.6 |
| 100 | 4.7 | 6.0 | 6.0 | 6.1 |
| 200 | 4.3 | 5.3 | 5.3 | 5.4 |
| pan | 0.5 | 0.7 | 0.7 | 1.4 |

Examples 26 and 27 indicate the strength of the pellets of this invention under high weights (such as the weights which are commonly experienced in a silo storage system). The high degree of retention with U.S. Sieve Series Nos. 35, 60, 100 and 200 indicates the good strength and low dusting value of the agglomerates of this invention.

This invention has been described in detail with particular reference to certain embodiments, but variations and modifications can be made without departing from the spirit and scope of the invention as defined in the following claims.

What is claimed is:

1. A process for the manufacture of a kaolin clay agglomerate which consists essentially of calcined kaolin clay, hydrous kaolin clay and water, wherein the process comprises the sequential steps of:
   a. a pre-agglomeration step of mixing calcined kaolin clay, hydrous kaolin clay and water to obtain a homogenous mixture; and
   b. an agglomeration step of subjecting the homogenous mixture to a pressure of about 300–1500 pounds per square inch to form an agglomerated product,
   wherein the product has a bulk density of at least 30 lbs./cu. ft.; a dusting value of less than 2 percent; a 325 mesh screen residue of less than 0.05 percent, good optical properties and improved rheological characteristics.

2. A process as defined by claim 1 wherein the bulk density is at least 40 lbs./cu. ft.

3. A process as defined by claim 1 wherein the dusting value is less than 1 percent.

4. A process as defined by claim 1 wherein the 325 mesh screen residue is less than 0.01 percent.

5. A process as defined by claim 1 wherein the optical properties are such that the kaolin clay agglomerate can be used in paper coating and filling applications.

6. A process as defined by claim 1 wherein the rheological characteristics are improved as compared to the rheological characteristics of the starting clay mixture.

7. A process as defined by claim 1 wherein the pressure is from about 300–1000 pounds per square inch.

8. A process as defined by claim 1 wherein the pressure is from about 500–1000 pounds per square inch.

9. A process as defined by claim 1 wherein, in a post-agglomeration step, the agglomerated product is dried to a moisture content of about 0–10 percent.

10. A process as defined by claim 9 wherein the moisture content is from about 2–7 percent.

* * * * *